Dec. 19, 1961 B. E. ENSSLE 3,013,445

MECHANICAL MEMORY DEVICE

Filed April 13, 1959

6 Sheets-Sheet 1

INVENTOR.
Bruno E. Enssle
BY
Gary, Desmond & Parker
ATTYS

INVENTOR.
Bruno E. Enssle
BY
Gary, Desmond & Parker
ATTYS.

Dec. 19, 1961

B. E. ENSSLE 3,013,445

MECHANICAL MEMORY DEVICE

Filed April 13, 1959

6 Sheets-Sheet 3

INVENTOR.
Bruno E. Enssle
BY
Gary, Desmond & Parker
ATTYS.

Dec. 19, 1961

B. E. ENSSLE 3,013,445

MECHANICAL MEMORY DEVICE

Filed April 13, 1959

6 Sheets-Sheet 4

INVENTOR.
Bruno E. Enssle
BY
Gary, Desmond & Parker
ATTYS

INVENTOR.
Bruno E. Enssle
BY
Gary, Desmond & Parker
ATTYS.

MECHANICAL MEMORY DEVICE

Filed April 13, 1959

6 Sheets-Sheet 6

Inventor:
Bruno E. Enssle
By Gary, Desmond & Parker attys.

United States Patent Office 3,013,445
Patented Dec. 19, 1961

3,013,445

MECHANICAL MEMORY DEVICE

Bruno E. Enssle, Boulder, Colo., assignor to Binks Manufacturing Company, Chicago, Ill., a corporation of Delaware Filed Apr. 13, 1959, Ser. No. 805,911
12 Claims. (Cl. 74—568)

This invention relates to improvements in a "memory device" particularly a mechanical memory device which can be associated with a type of mechanism in which the recorded or "memorized data is recalled" at a predetermined phase relationship with respect to the moment of recording.

In the device with which the present invention may be associated, the recalled information is ordinarily used as a basis for performing a predetermined operation at a period which lags in time the moment of recording. An example of the use of the invention is in the control of automatic spraying equipment for applying paint to leather or other irregular objects as they move along a conveyor. For practical reasons, it is undesirable to attempt to use a detector within the spray area for establishing the outline of the hide in order to direct the spray exclusively at the hide rather than at the full width of the conveyor. However, it has proved to be entirely satisfactory to record an image of the outline of the hide at a distance "upstream" along the conveyor from the spray position, followed by the use of the recorded image to energize the spray controls after an exact time delay which will permit the hide to move on the conveyor from the detecting point down to the spray chamber. The wording "recording image" used above is intended in a very broad sense. Any data which signifies the presence of leather on the conveyor at a particular point amounts to an "image" when a multitude of these points and data associated therewith are combined to represent a unified system of signals.

To facilitate calibration of the memory-recall units and to adapt standard units to a variety of installations, it is highly desirable that the delay period be easily adjustable. This invention provides a primarily mechanical unit for "memorizing" the data, with electrical switches being used as a means of recalling the information as the preferred and most simple arrangement. The use of a switch actuator for recalling the data is entirely a matter of choice.

In the preferred form of the invention, the basic unit comprises a juxtaposed rotor and stator with shaft means for rotating the rotor. A plurality of balls are confined between the rotor and stator, the balls being confined to two concentric annular paths. At a predetermined phase of rotation of the rotor with respect to the stator, the balls are carried by the outer annular path. Shortly after said phase, mechanism is contemplated for selectively positioning the balls in either the inner or outer annular path, said mechanism being actuated by feeler means which functions in response to the presence or absence on a conveyor of an article which is to be subsequently acted upon by the mechanism which the memory device is to control. The presence or absence of balls in the outer annular path is electrically detected, at a later phase of revolution of the rotor and a signal is transmitted at such later phase which is received and "decoded" in terms of an action upon the article which itself is at a later phase in its travel.

The lag in time between the storing of the signal and the transmitting thereof can be readily and simply changed in the present device by optionally positioning the electric detecting device on the rotor periphery relative to the path-selecting mechanism, this relationship being timed to the movement of the article to be acted upon.

One of the important advantages of the present invention resides in a mechanism which can be accurately timed; will not readily jam or lose its calibration and the basic mechanism may be used in multiple to detect and store or record area patterns. In addition, such stored or recorded patterns may be transmitted in multiple by merely duplicating the electrical detecting device at different phases of revolution of the rotors.

Other objects and advantages of the present invention will be apparent from the accompanying drawings and following detailed description.

Figures 1, 2:
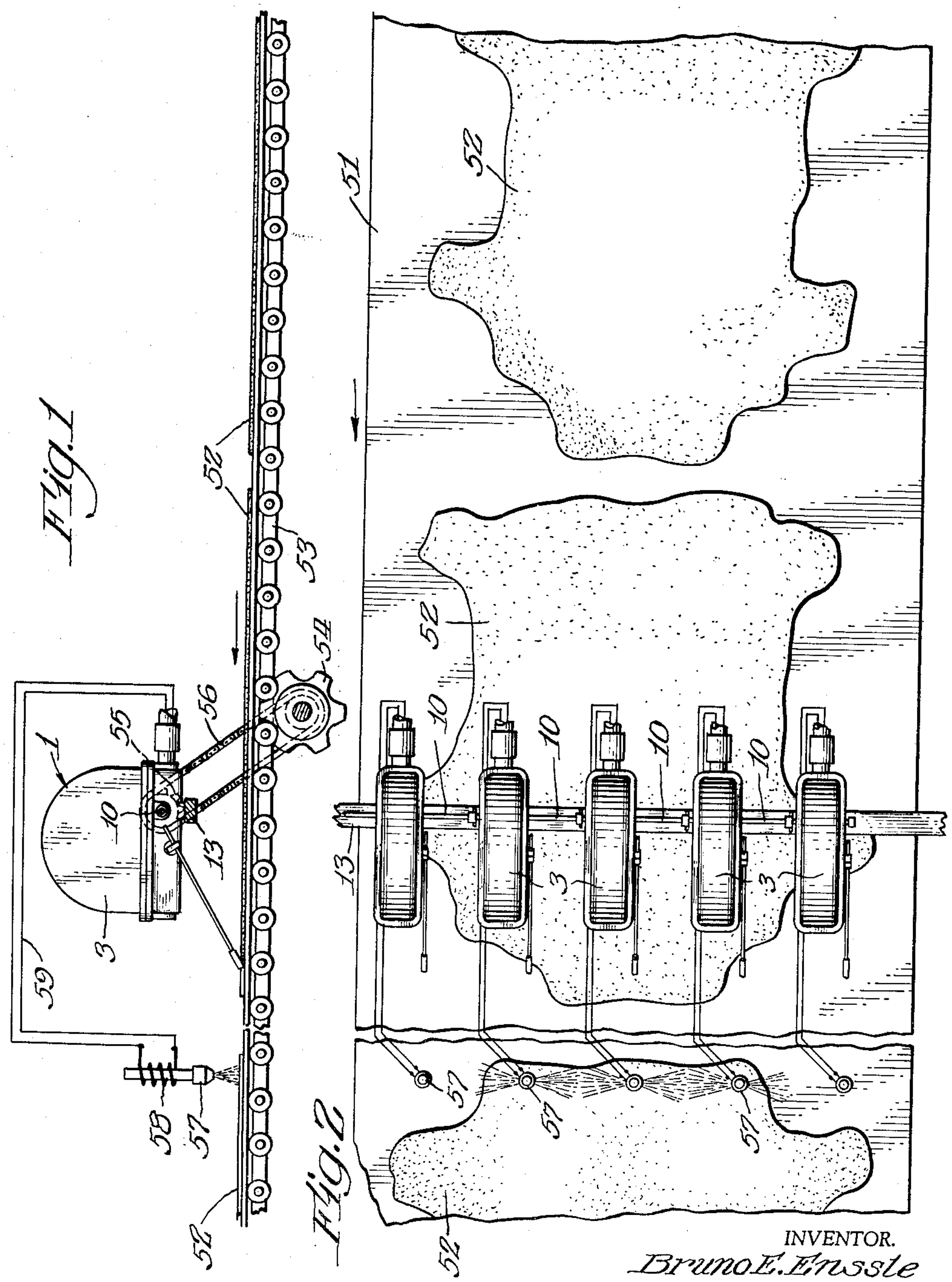
FIG. 1 is a diagrammatic side elevational view of devices embodying the concepts of the present invention used in conjunction with an automatic spray device.
FIG. 2 is a top plan view of the mechanism shown in FIG. 1.
Figure 4:
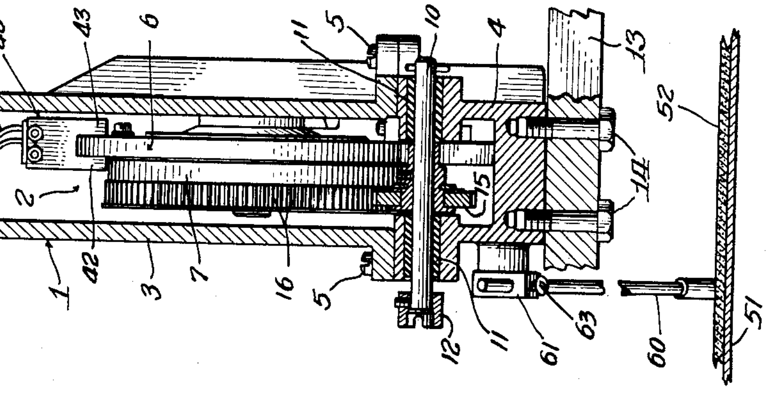
FIG. 4 is a sectional view taken on line 4—4 of FIG. 3.
Figure 3:
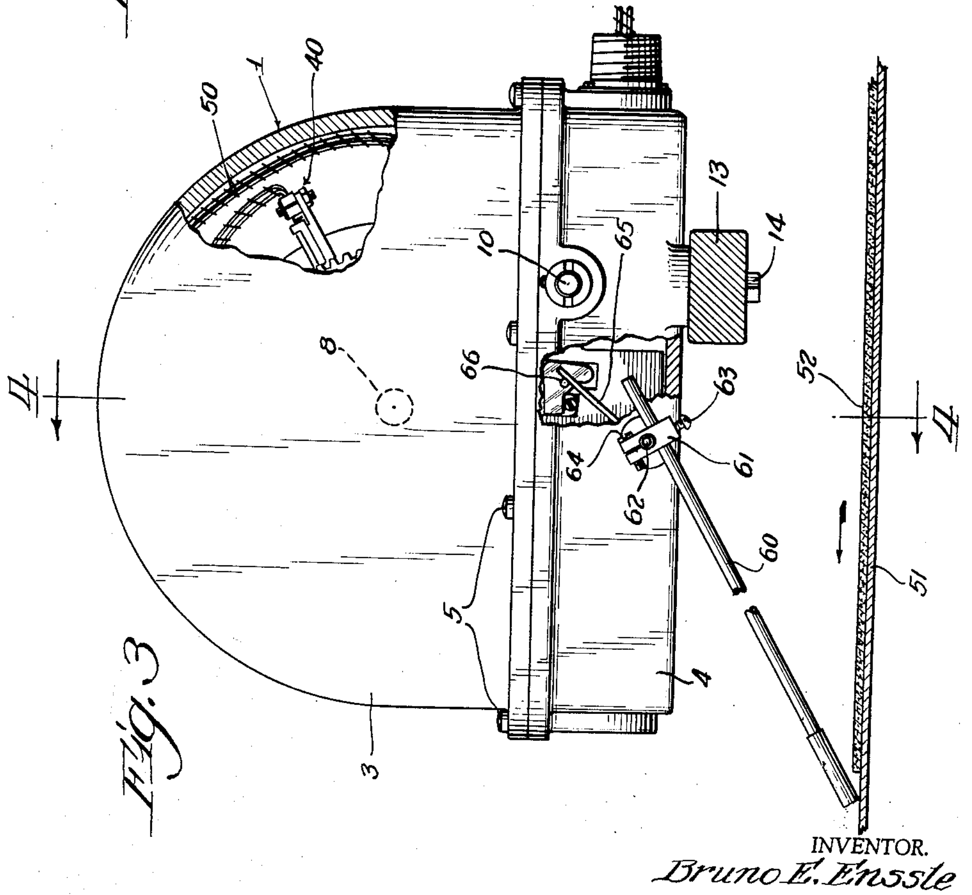
FIG. 3 is an enlarged elevational view, parts being broken away, of a device embodying the concepts of the present invention.

Referring in detail to the drawings and with specific reference to FIGS. 3 and 4, 1 indicates a housing in which a basic unit 2 embodying the preferred concepts of the present invention is contained. The housing 1 comprises a cover portion 3 and a base portion 4, the cover portion being secured to the base portion by screws 5. The basic unit 2 comprises essentially a stator 6 and a juxtaposed rotor 7, the rotor being carried by a shaft 8 (FIG. 6) which is journaled in a ball bearing assembly 9 carried by the stator 6.

A drive shaft 10 for rotating the rotor 7 is journaled in sleeve bearings 11 which are carried by the base portion 4. In one manner of use of the invention, the basic mechanisms are used in multiple and the corresponding shafts 10 of the units are coupled together by suitable couplings 12 whereby the rotors 7 of all the units may be driven simultaneously. In employing the device for automatic paint spraying to which the device is ideally adapted, each housing 1 may be carried by a suitable support 13 (FIGS. 1 and 2) and may be fastened thereto by screws 14 which extend into the bottom of the base portion 4.

A pinion gear 15 is mounted upon shaft 10 of the unit 2, and meshes with gear teeth 16 carried by the rotor 7. Thus, rotation of shaft 10 drives the rotor 7 relative to the stator which is fixedly mounted in the housing 1.

Figures 5, 6, 7:
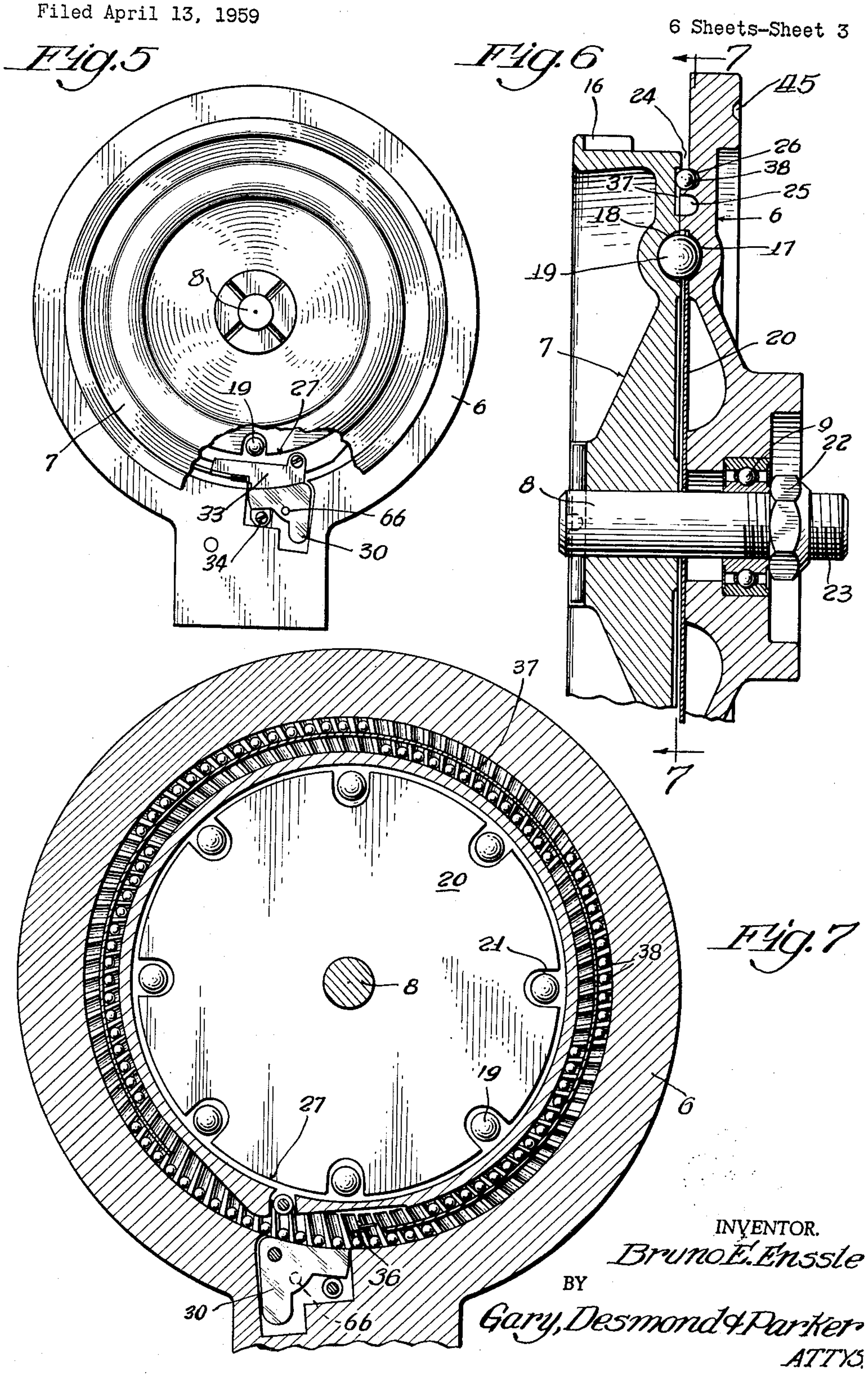
FIG. 5 is a front elevational view, with the outer housing removed and parts being broken away, of the stator and rotor of the device comprising the present invention.
FIG. 6 is an enlarged fragmentary detailed sectional view of the stator and rotor.
FIG. 7 is a sectional view, reduced in size, taken on line 7—7 of FIG. 6.
Figures 8, 9, 10:
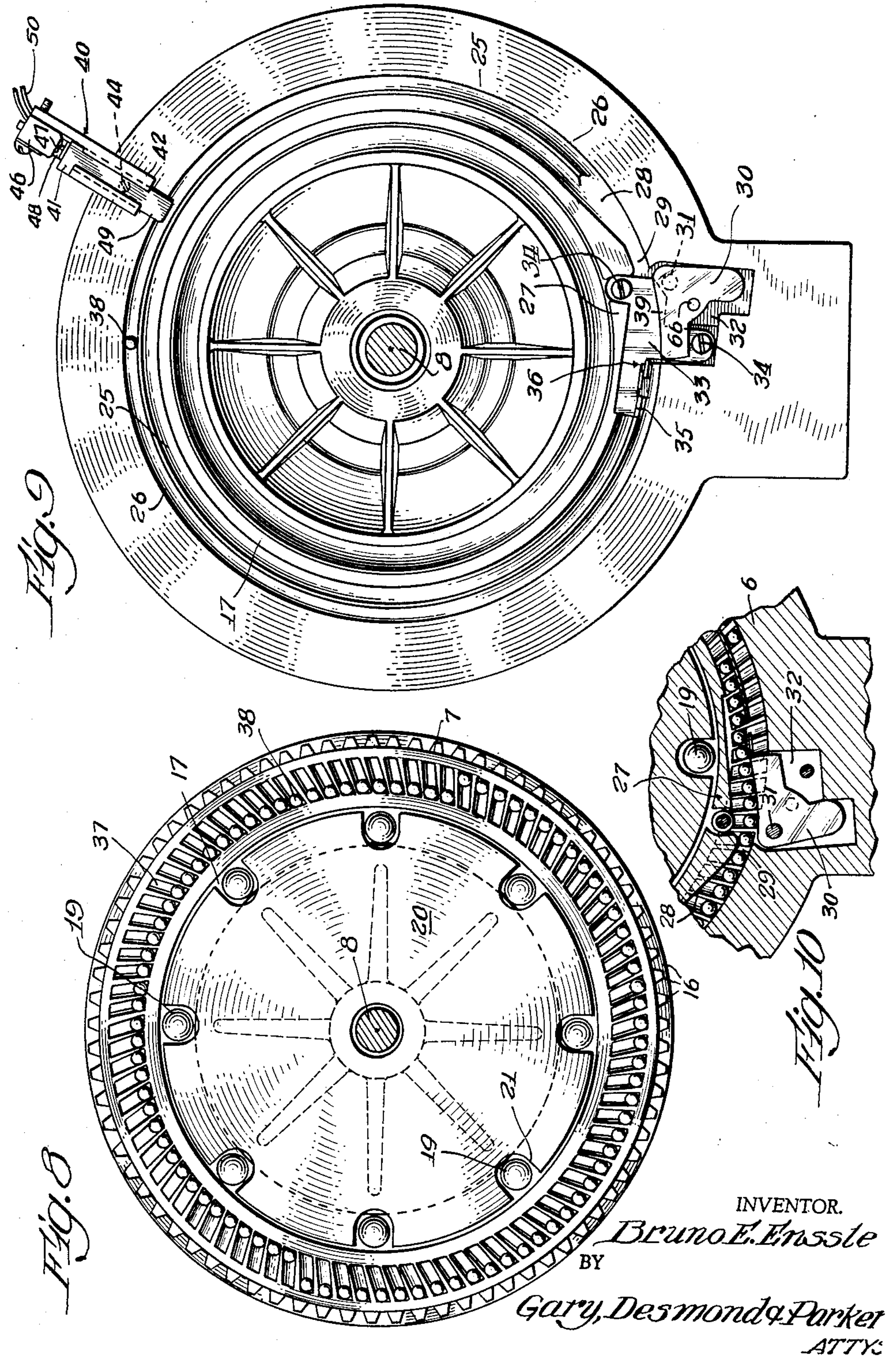
FIG. 8 is an elevational view of the inner face of the rotor.
FIG. 9 is an elevational view of the inner face of the stator.
FIG. 10 is a fragmentary detailed sectional view of the association of the ball-diverting path-selecting mechanism.

Referring particularly to FIGS. 6, 8 and 9, the stator 6, at its inner face, is provided with an annular substantially semicircular sectioned groove 17 and the rotor 7 is also provided with a similar companion groove 18, the grooves 17 and 18 facing each other and forming the race for ball bearings 19. A plate 20 embraces shaft 8 and is positioned between the stator and rotor, said plate being circular and being provided with angularly spaced notches 21 in each of which a ball bearing 19 is positioned whereby the balls in the race are angularly spaced from each other. In effect, the plate 20 functions as a cage for the balls.

When the stator and rotor are assembled, a nut 22 engages the threads 23 carried on shaft 8 whereby the stator and rotor may be assembled. The balls 19 thus function as antifriction means to permit free rotation of the rotor relative to the stator. The peripheral portions of the stator and rotor are spaced from each other, as at 24 in FIG. 6, the balls 19 and grooves 17 and 18 being of such dimensions as to maintain this space. Hence, the balls 19, to a degree, function as spacers.

A pair of substantially annular grooves 25 and 26 are provided in the inner face of the stator, said grooves being substantially semicircular in section; being concentric with each other and radially adjacent each other. Both of the grooves 25 and 26 are positioned radially outwardly and concentric with the race for the ball bearings 19.

The grooves 25 and 26 are discontinuous in the sense that they terminate as grooves per se in a zone which will hereinafter be referred to generally as the triggering zone 27 (FIGS. 5, 7, 9 and 10). At one portion of the triggering zone, the two grooves 25 and 26 merge into a tapered zone 28 (FIG. 9) which itself terminates in a passageway 29, said passageway being in substantial circular alignment with the outer groove 26. Adjacent the outlet of passageway 29 a substantially triangular shaped trigger 30 is positioned, said trigger carrying a journaling pin 31 about which the trigger swings. The portion of the zone in which the trigger 30 swings is recessed, as at 32 in FIGS. 9 and 10, the surface of the trigger being substantially flush with the inner surface of the stator.

A spring-carrying insert 33 is also positioned in the triggering zone, being secured to the stator by screws 34. The upper face of the insert 33 is flush with the base of the grooves 25 and 26 and a guide flange 35 is struck up from the insert 33, said flange being in substantial alignment with the wall separating grooves 25 and 26. A spring 36 is carried by the insert 33, the disposition and function of which will be hereinafter more fully described.

The juxtaposed inner face of rotor 7 is provided with an annular series of grooves 37 (FIG. 8) which have radial extents sufficient to bridge both grooves 25 and 26. The grooves 37 are not radial but are inclined to the radial in such manner that the inner radial end of each groove leads the outer radial end of said groove, considered in the direction of rotation of the rotor.

In the use of the invention, a ball 38 is positioned in each groove 37 and when the stator and rotor have been properly assembled, the balls 38 in each groove will also be positioned in either groove 25 or 26 or in the triggering zone 27. When the rotor rotates, the balls 38 are moved circularly by the ribs separating adjacent grooves 37. As can be observed from FIG. 6, the cage provided by groove 37 and grooves 25 or 26 is of sufficient size as to permit free movement of the balls in the facing grooves.

The inclination of grooves 37 to the radial is such that when the rotor rotates in its intended direction, a component of the circular force applied to each ball tends to urge said ball radially outwardly. This radial component exercises its major function at the triggering zone 27.

When the device is mounted for operation, the triggering zone 27 is lowermost so that the force of gravity may be employed both on the balls 38 and the trigger 30, as will be hereinafter more fully described.

When the balls 38 are properly positioned in the grooves 37, as hereinbefore described, and the rotor 7 is rotated, the balls 38, by gravity and by the inclination of grooves 37, seek an outer or downward position and tend to ride along the curved surface 39 of trigger 30. With the trigger positioned as shown in FIG. 9 the balls 38 ride over surface 39 and enter the outer groove 26. The trigger 30, however, may be rotated about pin 31 to the position shown in FIG. 10 whereupon the curved surface 39 of the trigger 30 guides the balls radially inwardly into the inner groove 25. Thus, the balls 38 which, when they enter the tapered zone 28, move to an outer radial position and pass through mouth 29, may be thereafter passed to the inner groove 25 or may be permitted to enter the outer groove 26, by the manipulation of trigger 30. It can therefore be appreciated, depending upon the actuation or nonactuation of trigger 30, a group or several spaced groups of balls may, during one revolution of the rotor 7, be positioned in the outer groove 26.

Figure 18:
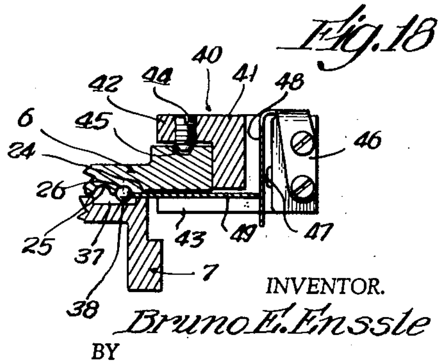
FIG. 18 is a detailed sectional view illustrating the detecting mechanism employed in the device.

Employing this control factor, the present invention contemplates a detector mechanism 40 which, at a predetermined phase of rotation, detects the presence of those balls in groove 26. This detector may conveniently take the form of an electric switch. Such a switch and its positional relationship to the other parts of the device is shown in detail in FIG. 18.

The detector 40 comprises a clamping block 41 which may be substantially U-shaped, having opposed arms 42 and 43, which may embrace a peripheral portion of stator 6. A set screw 44 is carried by arm 42 and may engage in a desired circumferential position in an annular groove 45 provided in the peripheral portion of the stator, to fasten the block securely. The block 41 may also carry a conventional micro-switch 46, having an actuating pin 47 manipulatable by a spring arm 48. A feeler arm 49 is slidably carried by block 41, one end of which bears upon the spring arm 48 and the other end of which protrudes through slot 24 into groove 26.

When a ball 38 or group of balls pass feeler arm 49, switch 46 will be actuated, switch 46 preferably being of the type which is normally off but will be turned on as long as an urging force acts on pin 47. Thus when switch 46 is actuated, a signal may be sent through conductors 50 to a device which may perform the ultimate function of the operation.

Detector 40 may be positioned at a desired phase of rotation of the rotor relative to the triggering zone 27. Thus a time lag is provided between the time trigger 30 is actuated and the time that the signal is sent by detector 40. Further, a plurality of detectors similar to detector 40 may be employed and may be spaced at different angular positions relative to the triggering zone 27. Thus, a patterned operation of trigger 30 may repeat the pattern in terms of delayed electrical signals at different phases of revolution of the rotor 7.

The present device may be employed in substantially all cases where impressed or recorded data is to be repeated at a later time to perform a predetermined operation. For purposes of illustration but not of limitation, the use of the device in the paint spraying of irregularly shaped hides will be described.

Referring particularly to FIGS. 1 and 2, a typical automatic paint spraying arrangement is diagrammatically shown. In the paint spraying operation a conveyor belt 51 moves forwardly, carrying on its upper surface a plurality of hides 52 which are to be sprayed with paint or other liquid. The conveyor belt 51 is preferably carried forwardly by a chain 53 which is trained around a sprocket wheel 54. In the spraying of such articles as hides, area patterns are dealt with and consequently a plurality of the basic units 2 are employed. The housings 1 for supporting the units may be carried upon the support 13 which extends transversely across and above the conveyor belt. The shafts 10 of the units are all coupled together and a sprocket wheel 55 is carried upon an endmost shaft 10. A second sprocket wheel may be mounted upon the shaft which carries the sprocket wheel 54 and a chain 56 may be trained around said sprocket wheel and also trained around sprocket wheel 55. Thus shaft 10 will be rotated in timed relationship with the translatory movement of belt 51. In a position spaced downstream from the position of the units 1, considering the direction of movement of the conveyor belt 51, are a plurality of spray guns 57, each of said guns being independently operated by a solenoid 58 which when energized causes the gun to fire. Each of the solenoids may be connected by conductors 59 to the conductors 50 of the detectors associated with each of the units 1. Thus, as has been hereinbefore described, when a delayed signal is sent out by each of the units, said signal will actuate a solenoid 58 associated with a respective unit.

A feeler arm 60 is carried by a block 61 which is mounted upon a shaft 62 journaled in the base 4 of each housing. The mounting of the feeler arm 60 with respect to block 61 is such that the arm may be lengthened or shortened effectively by the proper manipulation of set screw 63 and similarly the block 61 may be mounted in a desired angular position upon the shaft 62 by means of the screw 64. The opposite end of shaft 62 is connected to an intermediate link 65 which is adapted to contact a pin 66 carried upon each trigger 30.

The arrangement is such that the free end of the feeler arm 60 rests upon the conveyor belt and when the feeler arm is in its normal position, the linkage arrangement between the feeler arm and the trigger 30 is such that the trigger is in its upwardly swung position, as illustrated in FIG. 10. If a ribbon type conveyor is employed, the feeler arms extend into the spaces between the ribbon conveyors. In either case, by normal position of the feeler arm 60 is meant when the end of the feeler arm rests upon the conveyor belt 51 per se or between the ribbon conveyors. When one of the hides 52 passes beneath the feeler arm 60 said arm is rotated in a clockwise direction, as viewed in FIG. 3. This rotation results in clockwise rotation of the link 65 which is thus removed from its supporting position with respect to pin 66 and permits trigger 30 to rotate in a counterclockwise direction. In other words, the trigger swings by gravity about the pivot pin 31 to the position illustrated in FIG. 9.

Accordingly, when the feeler arm 60 is in its normal position, that is, when it does not contact one of the hides 52, the balls 38 are diverted by the trigger 30 from their outer radial position within the triggering zone 27 to the inner groove 25. When the arm 60 contacts a hide and the trigger 30 is moved to the position shown in FIG. 9, the balls entering the triggering zone 27 are not diverted by the trigger 30 but are permitted to resume their outermost radial position and enter the outer groove 26. As long as the arm 60 makes contact with the hide 52, balls will continue to enter the outer groove 26. The rotation of the rotor 7 is timed with the translatory movement of the conveyor belt 51 and, hence, the balls which have been permitted to enter the outer groove 26 will move through an angle determined by the position of the detector 40. Simultaneously the hide which actuated the trigger will have moved to a position beneath the spray guns 57. Hence, when the balls in the outer groove 26 actuate the detector 40 a signal is sent to the solenoid 58 associated with the detector and the gun will be fired. By employing a multiplicity of units, each of which being associated with a spray gun, a spray pattern may thus be impressed on the spray guns by the units, said spray pattern being in conformity with the general outline of the hide 52 but being delayed in time by the relationship of the angular movement of the rotor and the translatory movement of the conveyor belt.

Figures 11, 13, 14:
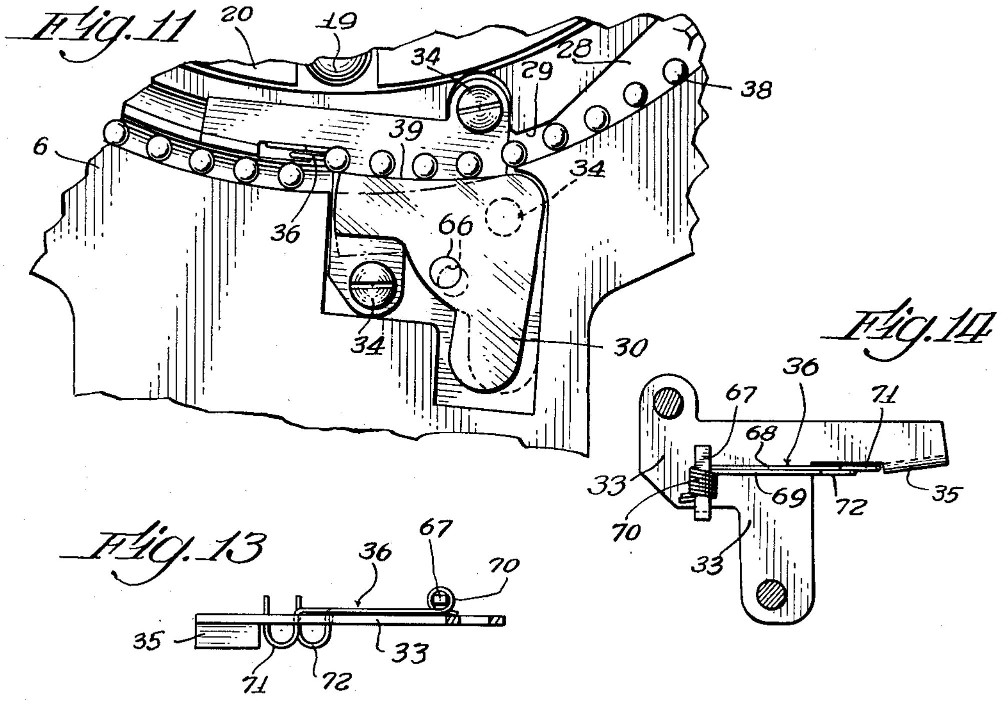
FIG. 11 is an enlarged fragmentary elevational view of the ball-diverting path-selecting mechanism.
FIG. 13 is a side elevational detailed view of the spring ball abutment employed in the invention.
FIG. 14 is a top plan view of the device shown in FIG. 13.

In order to eliminate the possibility of the balls jamming in the triggering zone when the trigger is rocked, a spring 36 is employed which is carried by the plate insert 33. In FIGS. 13 and 14 the insert plate and spring are shown in detail. As has been hereinbefore described, insert plate 33 is secured in the triggering zone 27 by screws 34. The plate 33 carries a flange 35 which is in alignment with, and a substantial continuation of the division wall which separates grooves 25 and 26. A flange 67 is also carried by the plate 33 and functions as an anchor for spring 36. Spring 36 comprises a pair of wire members 68 and 69 which are disposed substantially parallel and wound in a coil 70 around the flange 67. From the anchor flange 67 wire member 68 extends forwardly and is formed into a U-shaped loop 71, the loop being disposed adjacent flange 35 and in substantial alignment therewith. From the anchor flange 67 the wire member extends forwardly and also terminates in a U-shaped loop 72 which is disposed laterally adjacent and rearwardly of loop 71 Thus, loops 72 and 71, in effect, comprise a continuation of the flange 35 but are offset from each other.

In most instances, when trigger 30 moves, a ball 38 will be unrestrictedly diverted into groove 25 or 26. However, in some cases, the ball, at the period of movement of the trigger might assume a "dead center" position with regard to the two grooves, and were the division wall at the entrance of the grooves rigid and unyielding, there is the possibility that the ball may become jammed. However, by the use of the yielding loops 71 and 72 the ball, which would otherwise jam, will laterally flex the loops and thus be diverted to one or the other of the grooves without jamming.

Figure 15:
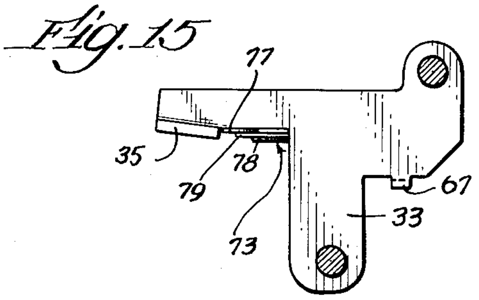
FIG. 15 is a face view of a modified spring abutment.
Figure 17:
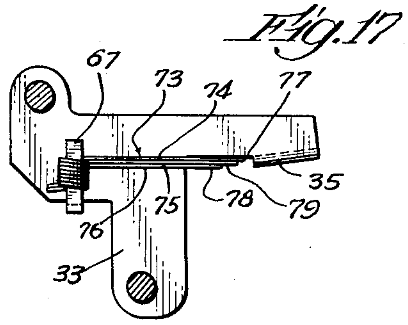
FIG. 17 is a rear face view of the device shown in FIGS. 15 and 16.
Figure 16:
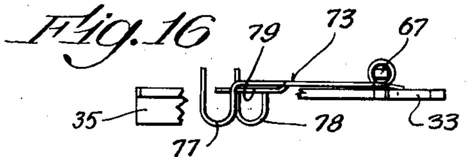
FIG. 16 is a side elevational view of the device shown in FIG. 15.

Referring in detail to FIGS. 15, 16 and 17, a spring 73 may be employed in place of spring 36. Spring 73 comprises three substantially parallelly disposed wire members 74, 75 and 76. The parallel wire members may be coiled around the anchor plate 67 in the fashion of coil 70 and member 74 terminates in a loop 77 and member 76 terminates in a loop 78. Member 75, however, is not looped and extends in a slightly offset manner, as shown best at 79 in FIG. 16, between the loops 77 and 78.

The loops 77 and 78 function in the same manner as loops 71 and 72, hereinbefore described, but member 75 functions as a separating member between the loops preventing unintended interengagement of the loops and separating the loops a greater distance laterally by the thickness of member 75.

Figure 19:
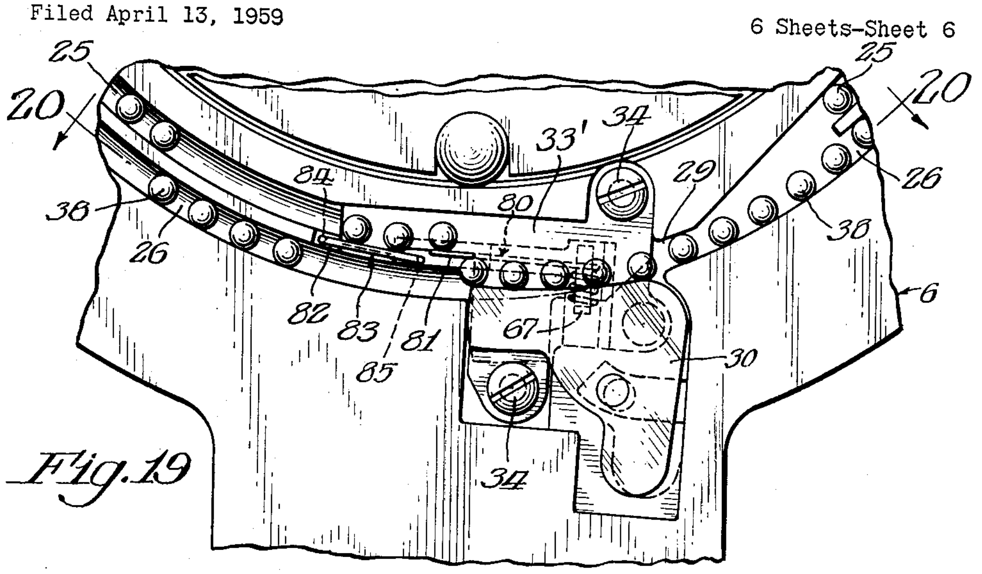
FIG. 19 is a fragmentary view similar to that shown in FIG. 11, showing a further modified form of spring abutment mechanism.
Figure 20:
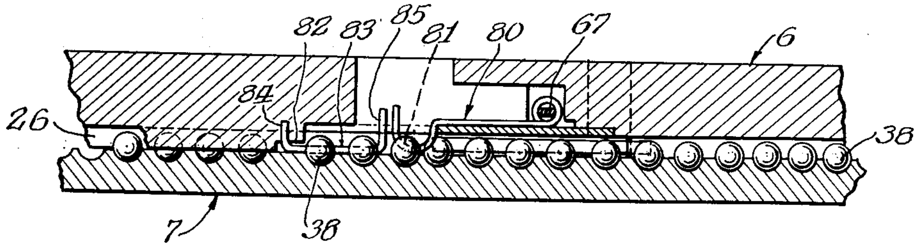
FIG. 20 is a sectional view taken on line 20—20 of FIG. 19.

Referring particularly to FIGS. 19 and 20, another modification of resilient arrangement for the prevention of jamming, is shown. In this form of the invention, a modified plate insert 33′ is employed. The plate insert 33′ is similar to the plate insert 33 except that the former carries no flange 35. The plate insert 33′ is secured in the triggering zone by means of screws 34 and said plate insert carries a tongue or flange 67 upon which spring 80 is anchored at one end, said spring end being coiled around the tongue 67. The opposite end of spring 80 carries a loop 81 which is disposed with its plane in substantial alignment with the division wall between arcuate grooves 25 and 26. However, said division wall is spaced from the loop 81 and is provided with a notch 82 at its end. A substantially U-shaped spring member 83 has one leg 84 rotatably embedded in the notched portion of the division wall. The intermediate portion of the spring member extends in substantial alignment with the division wall and is also in substantial alignment with the plane of loop 81 of spring 80. At its outer end, the U-shaped spring member 83 carries a leg 85 which is disposed adjacent the loop 81.

With the arrangement shown in FIGS. 19 and 20, it will be noted that the spring member 83 forms a virtual resilient continuation of the end of the division wall between grooves 25 and 26. Hence, at no time during the triggering action is a ball brought into contact with a rigid body until the individual ball has been adequately guided into one groove or the other by the resilient guiding means constituting the spring 80 and spring member 83.

The spring member 83, in addition to being resilient per se, also has limited pivotal movement about leg 84 which further augments the yielding action of the resilient guiding means.

Figure 12:
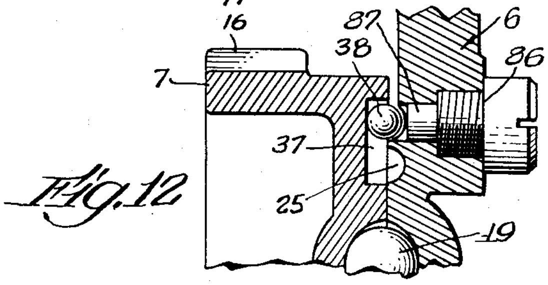
FIG. 12 is an enlarged fragmentary detailed sectional view showing the ball-charging opening in the stator.

Referring particularly to FIG. 12, a convenient arrangement for charging the balls 38 into the device is shown. With the rotor and stator assembled, as hereinbefore described, screw plug 86 which normally closes bore 87 in the stator 6 is removed and while slowly rotating the rotor 7, balls 38 may be charged into the outer arcuate grooves 26. As the grooves 37 in the rotor pass the bore 87, each of said latter grooves receives one ball 38 until all of the grooves 37 contain one ball each.

As has been hereinbefore described, the basic units 2 may be used in multiple and the pattern impressed or recorded by balls 38 in the outer groove may be repeated during a complete rotation of the rotor by using a plurality of angularly spaced detectors 40. In addition, although the device comprising the present invention has been used to control the remote spraying of hides, the basic unit, singly or in multiple, may be used for other control purposes. Accordingly, it is not intended that the present invention be limited to the exact details shown and described except as necessitated by the appended claims.

I claim as my invention:

1. A control device, comprising a stator having a stator face, a rotor rotatable relative to said stator, said rotor having a rotor face, said faces of said stator and rotor being juxtaposed, said stator face being provided with a pair of spaced parallel annular grooves, said rotor face being provided with a series of grooves arranged in the form of an annular ring, each groove of said series being disposed transverse to and connecting with the annular grooves in the stator face, a ball carried in each transverse groove and annularly movable in one of the annular grooves of the stator face when the rotor is rotated, said stator being provided with a triggering zone at a portion of the annular grooves into which both annular grooves connect, means carried by the stator in the triggerering zone for directing the balls in the respective transverse grooves selectively to said annular grooves, and a detector carried by said stator and angularly removed from said triggering zone for responding to the presence of a ball in one of said annular grooves when the rotor rotates.

2. A control device, comprising a stator having an inner face, a rotor rotatable relative to said stator, said rotor having an inner face, the inner faces of said stator and rotor being juxtaposed, said inner face of the stator being provided with an inner annular groove and an adjacent concentric outer annular groove, said inner face of the rotor being provided with a series of substantially radial grooves arranged in the form of an annular ring, each groove of said series connecting with the annular grooves in the stator, a ball carried in each substantially radial groove and annularly movable in one of the annular grooves of the stator when the rotor is rotated, said stator being provided with a triggering zone at a portion of the annular grooves into which both annular grooves connect, means carried by the stator in the triggering zone for directing the balls in the respective substantially radial grooves selectively to said annular grooves, and a detector carried by said stator and angularly removed from said triggering zone for responding to the presence of a ball in the outer annular groove when the rotor rotates.

3. A control device, comprising a stator having a stator face, a rotor rotatable relative to said stator and having a rotor face juxtaposed to said stator face, said stator face being provided with a pair of spaced parallel annular grooves, said rotor face being provided with a series of grooves arranged in the form of an annular ring, each groove of said series being disposed transverse to and connecting with the annular grooves of said stator face, a ball carried in each transverse groove and annularly movable in one of the annular grooves of the stator face when the rotor is rotated, said stator being provided with a triggering zone at a portion of the annular grooves into which both annular grooves connect, triggering means carried by the stator in the triggering zone for directing the balls in the respective transverse grooves selectively to said annular grooves, means connected to said triggering means and extending exteriorly of said stator for actuating said triggering means, and a detector carried by said stator and angularly removed from said triggering zone for responding to the presence of a ball in one of said annular grooves when the rotor rotates.

4. A control device, comprising a stator having a stator face, a rotor rotatable relative to said stator and having a rotor face juxtaposed to said face, the stator face being provided with a pair of spaced parallel substantially annular grooves, each of said grooves having an entrance end and an exit end, said rotor being provided with a series of grooves arranged in the form of an annular ring, each groove of said series being disposed transverse to and connecting with the annular grooves in the stator face, a ball carried in each transverse groove and annularly movable in one of the annular grooves of the stator face when the rotor is rotated, said stator being provided with a triggering zone into which the entrance ends and exit ends of the substantially annular grooves connect, means carried by the stator in the triggering zone for directing the balls leaving the exit ends of the substantially annular grooves to an entrance end of a selected substantially annular groove, and a detector carried by said stator and angularly removed from said triggering zone for responding to the presence of a ball in one of said substantially annular grooves when the rotor rotates.

5. A device as contemplated in claim 4 wherein resilient means separates the entrance ends of the two substantially annular grooves.

6. A device as contemplated in claim 5 wherein said resilient means comprises a pair of looped spring members mounted upon said stator, said looped spring members having the planes of the loops laterally offset from each other and with said planes substantially parallel to the axes of said substantially annular grooves and with the loops offset from each other along the length of said substantially annular grooves.

7. A device as contemplated in claim 6 wherein said resilient means includes a third spring member disposed between and separating said loops.

8. A control device, comprising a stator having a stator face, a rotor rotatable relative to said stator and having a rotor face, said faces of said stator and rotor being juxtaposed, stator face being provided with a pair of spaced parallel annular grooves, the mouths of said grooves opening to said stator face, said rotor face being provided with a series of grooves arranged in the form of an annular ring, the mouths of said last-mentioned grooves opening to said rotor face, each groove of said series being disposed transverse to and connecting with the annular grooves of the stator face, bearings disposed between the stator and rotor and spacing the stator face from the rotor face adjacent said grooves, a ball carried in each transverse groove and annularly movable in one of the annular grooves of the stator face when the rotor is rotated, said stator being provided with a triggering zone at a portion of the annular grooves into which both annular grooves connect, means carried by the stator in the triggering zone for directing the balls in the respective transverse grooves selectively to said annular grooves, and a signal-producing detector carried by said stator and angularly removed from said triggering zone, said detector comprising a detecting element disposed between the spaced faces of the stator and rotor and extending into the annular groove disposed most closely adjacent thereto for initiating a signal in response to the presence of a ball in the adjacent annular groove when the rotor rotates.

9. A control device comprising a pair of juxtaposed relatively movable members, one of said members being provided with a pair of parallel grooves, balls disposed between said members and movable in said grooves, means carried by the other member for moving said balls through said grooves, triggering means carried by one of said members intermediate the lengths of said grooves for directing the balls selectively into said grooves, and detector means carried by one of said members spaced from said triggering means and responsive to the presence of a ball in one of said grooves.

10. A control device comprising a stationary member and a juxtaposed movable member, one of said members being provided with a pair of parallel grooves separated by a rib disposed parallel to said grooves, balls disposed between said members and movable in said grooves, means carried by the other member for moving said balls through said grooves when said members move relative to each other, triggering means carried by one of said members intermediate the lengths of said grooves for directing a ball into a predetermined groove upon actuation of said triggering means, means connected with said triggering means and extending exteriorly of said members for actuating said triggering means, and detector means carried by one of said members spaced from said triggering means and responsive to the presence of a ball in one of said grooves.

11. A control device comprising a pair of juxtaposed relatively movable members, one of said members being provided with a pair of parallel grooves, balls disposed between said members and movable in said grooves, means carried by the other of said members for moving said balls through said grooves, a triggering zone in one of said members intermediate the lengths of said grooves, triggering means in said zone for directing balls selectively into said grooves, guide means in said triggering zone for receiving the balls from said triggering means and guiding them respectively into the selected groove, and detector means carried by one of said members spaced from said triggering means and responsive to the presence of a ball in one of said grooves.

12. In a device of the character described wherein balls are directed by a selectively movable trigger from a triggering zone selectively into a plurality of grooves for movement therethrough, guide means in the triggering zone for receiving the balls from the trigger and guiding them respectively into the selected groove.

References Cited in the file of this patent

UNITED STATES PATENTS

| | | |
|---|---|---|
| 1,771,905 | Uher | July 29, 1930 |
| 2,298,890 | Leonard | Oct. 13, 1942 |
| 2,609,926 | Hartig et al. | Sept. 9, 1952 |
| 2,675,778 | Peeps | Apr. 20, 1954 |
| 2,754,795 | Enssle | July 17, 1956 |